US007306148B1

(12) United States Patent
Morganstein

(10) Patent No.: US 7,306,148 B1
(45) Date of Patent: Dec. 11, 2007

(54) ADVANCED VOTING SYSTEM AND METHOD

(75) Inventor: Sanford J. Morganstein, West Dundee, IL (US)

(73) Assignee: Populex Corp., West Dundee, IL (US)

( * ) Notice: Subject to any disclaimer, the term of this patent is extended or adjusted under 35 U.S.C. 154(b) by 0 days.

(21) Appl. No.: 10/294,062

(22) Filed: Nov. 14, 2002

Related U.S. Application Data

(63) Continuation-in-part of application No. 10/001,511, filed on Oct. 31, 2001.

(60) Provisional application No. 60/308,465, filed on Jul. 26, 2001.

(51) Int. Cl.
*G06K 17/00* (2006.01)
*G07C 13/00* (2006.01)

(52) U.S. Cl. .......................... 235/386; 235/51; 235/56; 235/57

(58) Field of Classification Search ................ 235/386, 235/50, 51, 56, 57; 705/12, 50
See application file for complete search history.

(56) References Cited

U.S. PATENT DOCUMENTS

| | | | | |
|---|---|---|---|---|
| 3,944,788 | A * | 3/1976 | Comisar et al. | 235/54 F |
| 4,717,177 | A | 1/1988 | Boram | 283/5 |
| 5,278,753 | A | 1/1994 | Graft, III | 364/409 |
| 5,377,099 | A | 12/1994 | Miyagawa | 364/409 |
| 5,412,727 | A | 5/1995 | Drexler et al. | 380/24 |
| 5,583,329 | A | 12/1996 | Davis, III et al. | 235/50 |
| 5,729,334 | A | 3/1998 | Van Ruyven | 356/71 |
| 5,878,399 | A | 3/1999 | Peralto | 705/12 |
| 5,901,203 | A | 5/1999 | Morganstein et al. | 379/88.02 |
| 5,956,122 | A | 9/1999 | Doster | 351/210 |
| 5,992,570 | A | 11/1999 | Walter et al. | 186/36 |
| 6,081,793 | A | 6/2000 | Challener et al. | 705/50 |
| 6,205,204 | B1 | 3/2001 | Morganstein et al. | 379/67.1 |
| 6,250,548 | B1 | 6/2001 | McClure et al. | 235/51 |
| 6,641,033 | B2 * | 11/2003 | McClure et al. | 235/51 |
| 6,769,613 | B2 | 8/2004 | McDermott et al. | 235/386 |
| 6,817,515 | B2 * | 11/2004 | Winnett | 235/51 |
| 6,892,944 | B2 | 5/2005 | Chung et al. | |
| 7,036,730 | B2 | 5/2006 | Chung | |
| 2003/0006282 | A1 * | 1/2003 | Vadura et al. | 235/386 |
| 2004/0169077 | A1 * | 9/2004 | Petersen et al. | 235/386 |

FOREIGN PATENT DOCUMENTS

EP 0 743 620 A2 11/1996

OTHER PUBLICATIONS

News Release, Jul. 16, 2001: "Up to 6 million votes lost in 2000 presidential election, Voting Technology Project reveals".*

(Continued)

*Primary Examiner*—Daniel Hess
(74) *Attorney, Agent, or Firm*—Baker Botts L.L.P.

(57) ABSTRACT

According to one embodiment of the present invention, an advanced voting system includes one or more computing devices. The one or more computing devices display ballot questions to the voter and receive interactive voter selections from the voter. A ballot generator generates encoded ballots encoded with the voter selections.

95 Claims, 4 Drawing Sheets

OTHER PUBLICATIONS

Ernest Hawkins, et al; letter at web page http://www.electioncenter.org/electionreformreport/Board%20of%20Directors%20Letter.htm, Printed Jul. 9, 2001.

"Table of Contents" at web page http://www.electioncenter.org/electionreformreport/Table%20of%20Contents%20Task%20Force%20Report.htm, Printed Jan. 8, 2002.

"National Task Force On Election Reform;" The Election Center; web page at http://www.electioncenter.org/electionreformreport/Prelim%20Pages%20for%20Task%20Force%20Report%20.htm, printed Jan. 8, 2002.

"Appendix A" at web page http://www.electioncenter.org/electionreformreport/APPENDIX%20A%20b%20C%20Task%20Force%20Report%20.htm, Printed Jan. 8, 2002.

"Bringing Accuracy And Simplicity To The Electoral Process," Fidlar Doubleday Inc., brochure, 6 pages.

The Election Center, "Election Reform Report," The Board of Directors of The Election Center, web page at http://www.electioncenter.org/electionreformreport, 84 pages, Jul. 2001.

Fidlar Doubleday Inc., web page at http://www.fidlar.com/ev2000.htm, 1 page, printed Jan. 2, 2002.

Fidlar Doubleday Inc., web page at http://www.fidlar.com/what.htm, 1 page, printed Jan. 2, 2002.

Populex, "I want my vote to count," Populex brochure, 8 pages, Apr. 2002.

Populex Corporation, "Background to the Populex™ election system," Populex Corporation, 4 pages, Apr. 2002.

Keeshan, "Voting by Computer," Daily Herald, 2 pages, May 14, 2002.

Allemeier, "Boland votes for touch-screen system," The Dispatch and The Rock Island Argus, 1 page, Jul. 25, 2002.

David Essex; "Experts vote down Internet elections;" MSNBC at web page http://www.msnbc.com/news/701210.asp, Mar. 5, 2002.

"The Caltech/MIT Voting Technoloby Project;" at web page http://www.vote.caltech.edu/Reports/july01/July01_VTP_%20Voting_Report_Entire.pdf, Feb. 19, 2002.

"VOTING—What is What Could Be," Caltech MIT Voting Technology Project; The California Institute of Technology Corporation, 97 pages at web page http://www.vote.caltech.edu/Reports/july01/July01_VTP_%20Voting_Report_Entire.pdf, Jul. 16, 2001.

* cited by examiner

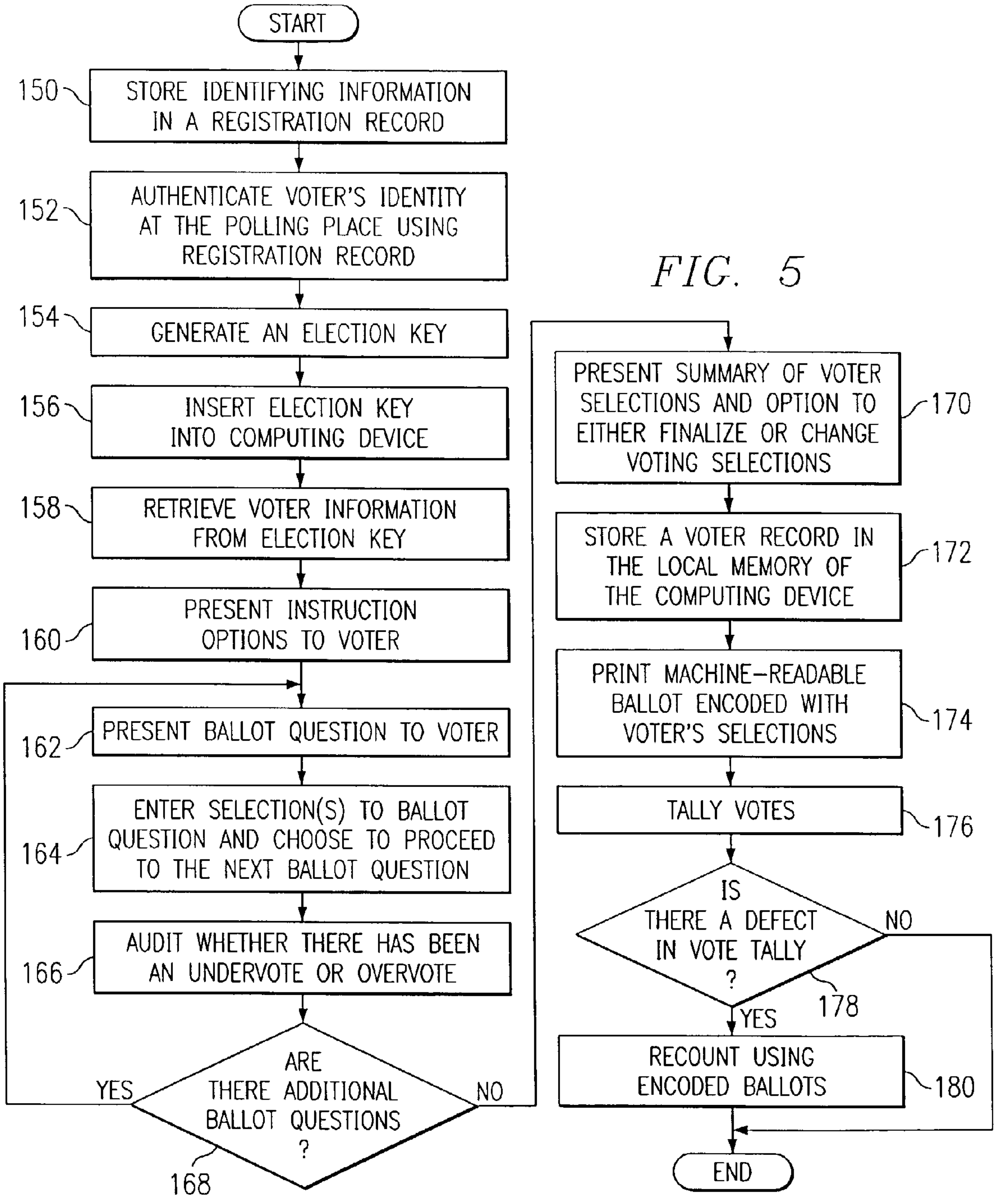
FIG. 5
FIG. 6
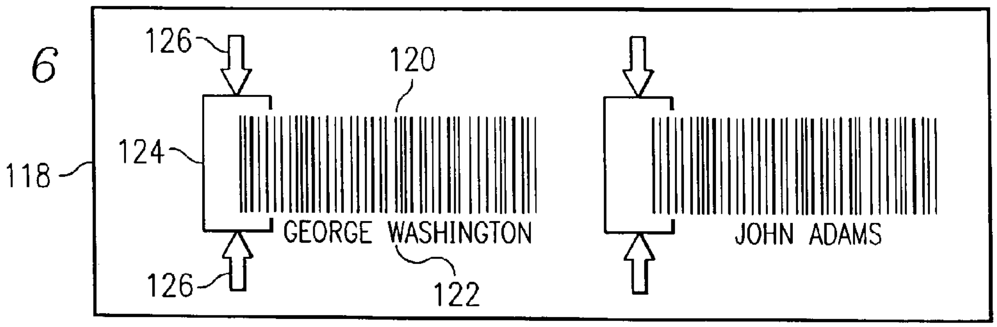

ADVANCED VOTING SYSTEM AND METHOD

RELATED APPLICATION

This application is a continuation-in-part of U.S. application Ser. No. 10/001,511 filed Oct. 31, 2001, by Sanford J. Morganstein, entitled "Advanced Voting System and Method," which claims the benefit under 35 U.S.C. § 119(e) of U.S. Provisional Application Ser. No. 60/308,465 filed Jul. 26, 2001 entitled "Advanced Voting System."

TECHNICAL FIELD OF THE INVENTION

This invention relates generally to voting, and more particularly to an advanced voting system and method.

BACKGROUND OF THE INVENTION

Voting systems have a variety of underlying objectives. First, a cornerstone of any democracy is an accurate voting system that minimizes disenfranchisement of voters. However, count accuracy is difficult because the large number of voters who participate in an election create variances in ballot output. Another objective of voting systems is to accurately gauge voter intent. Despite this objective, many factors may lead to situations in which voters are unclear as to what is required of them or unclear in indicating their selections. Such factors include ballot design, cumulative voting, multiple positions available for one office, proximity of candidate names on a ballot, unintentional markings left on a ballot, and misspelling of write-in candidates. Additionally, in some elections eligibility requirements or the issues involved restrict who has the right to vote. Thus, voting systems must also attempt to ensure that voters only vote the legal number of times and in the proper jurisdiction.

Methods of voting and counting votes have been in use since the earliest of human times. A paper ballot is a simple voting tool that is usually preprinted with the names of the candidates for a given office. In a paper ballot voting system, the voter marks an 'x' next to each candidate's name for whom the voter cares to vote. To maintain privacy, the voter folds the ballot and hands it to an election judge who deposits it in a ballot box. Alternatively, the voter may be requested to place the ballot in the ballot box himself. A second voting system developed to further these objectives uses mechanical voting machines. Typically, mechanical voting machines have levers next to the names of candidates and counters that increment each time a voter moves a lever to vote on a specific candidate or question. In a third system, the voter is given a paper ballot, called a punchcard, that contains perforated or otherwise weakened areas. The punchcard is inserted into a machine that displays the names of candidates or the questions in a referendum. The alignment of the punchcard in the machine is such that when the voter inserts a stylus next to the candidate's name, a piece of paper is punched out. The paper that is removed is called a chad. The hole in the place where the chad once was can be detected by a light sensitive card reader to determine the vote. In yet another system, the voter is given a paper ballot and the voter is asked to fill in a circle or box associated with the candidate or other ballot question. As is other paper ballot systems, the ballot is placed in a ballot box and is read at a later time. The machine that reads these ballots find light passing through some circles or boxes and not through others. The presence or absence of a mark in a box or circle indicates the voters' choices. Such systems are called "mark-sense" systems or, alternatively, optical scan systems.

Regardless of the system employed, problems have always existed with such systems. The first and foremost deficiency is count accuracy. When it comes to large numbers of ballots, human readers are often more prone to error. Mechanical voting machines improve the counting process by creating a tally for each candidate or question that can be recorded by election officials at the end of the election. Although more accurate, faster, and less labor intensive, mechanical voting machines do not leave an audit trail for authorities to follow in times of a recount. Additionally, voters have become disenfranchised by mechanical voting machines since allegations of tampering with the counters are difficult to dismiss and also because the voter has no assurance that his vote was tallied correctly.

Another deficiency in current voting systems stems from human error in making a selection. Variances in how voters mark a selection and erase a selection may render paper ballots unclear. Punch card systems attempt to replace human counting and selection entry errors with machine certainty, but create problems unique to punch cards. For example, voters may not force the stylus through with enough force to completely remove the chad. When entered into the counting machine, a partially removed chad may be reinserted into the hole nullifying the voter's intent altogether. Furthermore, a punched punchcard cannot be unpunched. An error in making the voter's selection requires the voter to begin the voting process anew.

Furthermore, other problems with a paper ballot voting system are overvoting and undervoting, which occur when a voter either votes for too many candidates or too few candidates, respectively. Mechanical voting machines sufficiently diminish this problem by making it difficult for a voter to vote for more candidates than is appropriate and by reminding the voter when a particular office or question has not been voted on. However, punch card and optical scan systems cannot detect an overvote or undervote until the votes are tallied. Additionally, where ballots are not counted immediately at the polling place, the voter is never afforded the opportunity to correct the situation.

Thus, regardless of the system employed, whether it is conventional paper ballots, mechanical machines, or punchcards, each system has deficiencies that effect the accuracy and efficiency of the voting process. The presidential election of 2000 has increased public awareness and concern about current systems employed.

SUMMARY OF THE INVENTION

According to the present invention, disadvantages and problems associated with previous voting methods and systems have been substantially reduced or eliminated.

According to one embodiment of the present invention, an advanced voting system includes one or more computing devices. The one or more computing devices display ballot questions to the voter and receive interactive voter selections from the voter. A ballot generator generates machine-readable ballots encoded with the voters selections.

In another embodiment of the present invention, an absentee ballot includes a plurality of machine-readable barcodes. Each barcode is associated with a voter option. The absentee ballot also includes a voter selection area associated with each barcode. The voter selection area is positioned such that when a voter marks a selection in the voter selection area, the associated barcode is altered so as to indicate a voter selection of the associated voter option.

Particular embodiments of the present invention provide one or more technical advantages. For example, one or more embodiments of the present invention may increase the accuracy of both the voting process and the vote tallying process while maintaining an audit trail for the purpose of recounts and challenges. An audit trail allows for more accurate, fair and expeditious procedures during a recount. As another example, certain embodiments of the present invention may more accurately reflect the intent of the voter through the use of interactive feedback and the voter's ability to change votes before the vote becomes final. Additionally, machine-readable ballots provided by particular embodiments may be read with greater accuracy than human-readable ballots, and yet such embodiments of the present invention also maintain versatility for write-in ballots.

Another technical advantage provided by one or more embodiments of the present invention is improved efficiency of the voting process. For example, particular embodiments may provide tools used by election officials to prepare computer ballots and absentee ballots. Additionally, certain embodiments may provide an efficient scheme for counting and verifying ballots cast by absentee voters. As another example of improved efficiency, delays during the counting of ballots and while awaiting publication of election results may also be substantially reduced. Finally, one or more embodiments may also facilitate voting by voters who do not speak English or who may be visually impaired.

Furthermore, one or more embodiments of the present invention may provide some or all of the preceding technical advantages while maintaining the secrecy of the ballot and preventing fraud. In one embodiment, of the present invention, biometric identification may be gathered at the time the voter registers and then used to verify the identity of the voter at election time. Fraud may be further minimized by increasing the difficulty for imposters to vote in lieu of bona fide voters. As another example, certain embodiments may also protect the privacy of the voter by informing the voter of undervote and overvote situations in the privacy of the voting booth. Meanwhile, detection and treatment of undervotes and overvotes may be tailored to follow the election rules of a particular jurisdiction.

Other technical advantages may be readily apparent to those skilled in the art from the figures, description and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 5 illustrates an example method of using an advanced voting system; and FIG. 6 illustrates an example system for absentee voting.

DETAILED DESCRIPTION OF EXAMPLE EMBODIMENTS

Figure 1:
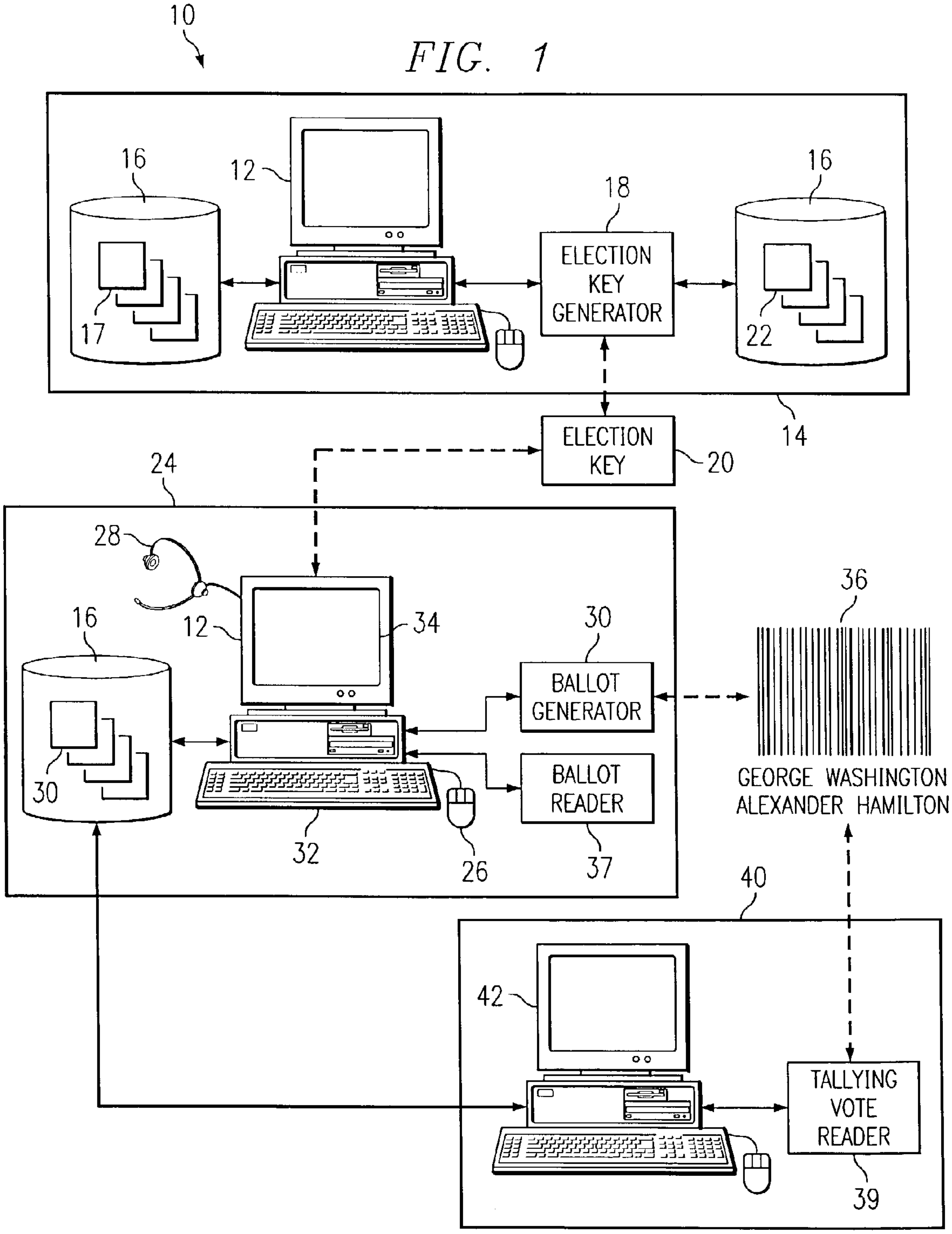
FIG. 1 illustrates an example advanced voting system.

FIG. 1 illustrates an example advanced voting system 10 including one or more computing devices 12 that create an accurate, anonymous, and verifiable record of voters' selections in machine-readable form. Advanced voting system 10 includes a voter identifier system 14 that stores identifying information associated with a voter and verifies the identity of the particular voter at the time of voter check-in at the polling place. Additionally, advanced voting system 10 includes a voting booth 24 that is operable to display ballot questions, receive voting selections from a voter, and generate a ballot encoded with such selections. Furthermore, system 10 includes a tallying system 40 that is capable of decoding an encoded ballot or may communicate directly with the voting booth 24 to tally votes stored within voting booth 24.

Voter identifier system 14 includes a computing device 12, one or more data storage locations 16, and an election key generator 18. A previously created voter signature may be stored as a registration record 17. Registration records 17 are stored in a data storage location 16 that is operable to communicate with computing device 12 or that is included within computing device 12. Registration records 17, used to authenticate the voter's right to vote in the particular election, are described in greater detail below with respect to FIG. 2. For example, an election judge may ask the voter to present a registration card and the signature on the card may be compared against the previously provided signature through the voter identifier system 14.

In one embodiment of voting system 10, identification of the voter through a registration record 17 allows an election key generator 18 to prepare an election key 20. Once a voter's identity has been verified using registration record 17, an election key 20 may be generated to enable the voter to vote in a voting booth associated with voter identifier system 14. Election key generator 18 is operable to communicate with one or more data storage locations 16 and computing device 12 to facilitate generation of the election key 20. The election key 20 may be encoded with a digital signature 22 of a specific election judge. A digital signature is an electronic signature that can be used to authenticate the identity of the sender of a message or the signer of the document. A digital signature is used to ensure that the original content of the message or document that has been sent is unchanged. Digital signature 22 may be specific to the particular precinct at which the voter is authorized to vote and may be stored in data storage location 16. Election key 20 may be a bar coded card, a magnetic stripe card, an optical disc (such as a CD-RW or CD-ROM), a magnetic disc (such as a floppy disk), or any other suitable data storage medium operable to be encoded with digital signature 22 and/or any other appropriate information allowing a voter to vote at a voting booth 24. As another example, election key 20 may include a smart card. A smart card is standard credit card-sized plastic card within which a microchip has been embedded. The smart card may include a memory-only chip, with storage space for data, or may include a microprocessor chip with the ability to process data onboard. Smart cards typically include cardholder verification techniques and security features built into the smart card chips.

The digital signature 22 encoded on election key 20 may be decoded by the computing device 12 on which the voter makes his voting selections to ensure that the voter does not substitute a different ballot from the one the voter is authorized to use. Validation through digital signature 22 also prevents interested parties from procuring copies of a ballot and "hiring" citizens to go into the polling place and deposit a ballot completed by someone other than the voter. Digital signature 22 may also be used when the ballot is read, as is described below. Additionally or alternatively, voting booth 24 may use election key 20 to select the appropriate computer ballot containing the races and questions for which the voter is authorized to vote. In such embodiment, election key 20 may be used to unlock electronic ballot information previously stored at voting booth 24. In another embodiment, an electronic ballot may be stored on election key 20 itself. This particular election key 20 may be encrypted using public/private key or any other appropriate encryption technology.

As with a traditional voting system, the voter may be directed to a voting booth that allows privacy for the voter. As described above, system 10 includes one or more electronic voting booths 24 in which a voter may vote (using election key 20, if appropriate). Each voting booth 24 may include an associated computing device 12. In certain embodiments, computing device 12 may be a personal computer which might include such components as a mouse 26, headphones 28, keypad 32, and display screen 34. However, any other computing device, such as a handheld computer with an appropriate input device, may also be used. In an embodiment where a programmable handheld device, such as a personal digital assistant (PDA) is used, the programmable device itself, along with its memory may be used to display the ballot, record one or more votes, and communicate the votes to tallying system 40. In such a case, the memory of the handheld device is read and the handheld device is returned to election booth 24 to allow voting by a different voter.

To initiate voting, computing device 12 may visually and/or auditorily prompt the voter to insert election key 20 into computing device 12 or a peripheral associated with computing device 12. Alternatively, computing device 12 may visually and/or auditorily prompt the voter to press an appropriate button on a keypad 32, press or touch a touch sensitive screen 34 connected to computing device 12, insert a ballot into a ballot reader or printer, or otherwise indicate that the voter is ready to begin. In one embodiment, computing device 12 may auditorily and/or visually ask the voter to insert into computing device 12 a specially coded compact disc (CD) which serves as election key 20. Insertion notification, a feature of some operating systems and CD readers may then be used to start the voting process. As previously described, computing device 12 may use digital signature 22 to verify that election key 20 is valid. Computing device 12 may then present a screen asking whether the voter would like help screens to assist with the voting process. The voter may choose to proceed through help screens or begin voting immediately without such help screens.

Where computing device 12 includes a set of headphones 28, the voter may listen to prerecorded instructions that may have been stored as wave files or any other appropriate audio files. The ability to provide instructions in an audio format facilitates the voting process for the visually impaired or by others who may not readily understand written text appearing on a computer screen 34. Auditory instructions in a language selected by the voter may also be used to emphasize important steps that the voter must take during the voting process to ensure that the voting process is not compromised. In various embodiments, appropriate auditory instructions may be played throughout the voting process to aid the voter in making voting selections. In a particular embodiment, instructions for using the computing device 12 may have information stored in several languages to accommodate voters for whom English may not be easy to understand. The choice of the language can be encoded in the election key 20 or may be selected by the voter.

The use of such speech files may also be used to provide remote voting over the telephone. One or more computing devices 12 may interface with a telephone system linking a computing device to a voter telephone. The computing device may include any computing device associated with voting system 10. In one example, the voter telephone may be the voter's personal telephone in the voter's home or office. Using the voter telephone, the voter may call into a specified number and be connected with a computing device 12. A computing device 12 may verify the voter's identity using a voice print analysis or any other appropriate technique. A computing device may broadcast recorded auditory instructions to the voter over the voter telephone. The auditory instructions in a language selected by the voter may instruct the voter on how to enter a voter selection. For example, the auditory instructions may instruct the voter to enter a voter selection by pressing a number on the keypad of the telephone in response to the voice messages. Alternatively or additionally, the auditory instructions may instruct the voter to enter a voter selection by speaking at a prompt. When the voter has finished voting (which the voter may indicate or which a computing device may determine), a computing device may generate an encoded ballot 34. The encoded ballot 34 may be handled by election authority to generate or verify ballot totals.

Computing device 12 may proceed to the computer ballot after the voter has received the instructions or has chosen to forego instructions. As an example, the first computer ballot question presented may be for the election of one or more candidates or for a referendum question. Any appropriate ballot formats may be used and presented to the voter. Furthermore, the voter may select a choice on a ballot using keypad 32, mouse 26, touch screen 34, or any other suitable technique. An example computer ballot and the process of indicating a selection on the ballot are described in greater detail below with respect to FIG. 3. Once voter has finished voting for a given ballot question by indicating his selections and by indicating his readiness to proceed to the next question, computing device 12 may determine if an overvote or an undervote has occurred. Alternatively and additionally, computing device 12 may determine all overvotes and undervotes after the voter has voted on all questions. Determining an overvote or undervote in an election in which only one choice is allowed (as for president of the United States) is very simple, as only one selection may be made. However, certain elections may ask the user to select n candidates from a list of m (as for a town council). An overvote occurs when voter selects more than n number of candidates. Conversely, an undervote occurs when voter selects fewer than n number of candidates. Computing device 12 will detect an overvote condition and proceed according to the rules of the election authority. Such rules could be the allowance of the overvote at voting time but disallowance of the vote at counting time, or not allowing the voter to overvote at all. On the other hand, if an undervote is detected, the voter may be warned that it has occurred and given a choice to proceed without adding another choice or to vote for another candidate.

When the voter has finished voting (which the voter may indicate or which computing device 12 may determine), the voter is presented with a summary on screen 34 showing the voter's selections. The voter may be presented with the choice of printing a completed ballot or returning to voting. When the voter indicates that all choices are final, computing device 12 generates an encoded ballot 36 using ballot generator 30 included in voting booth 24 or otherwise in communication with computing device 12. In one particular embodiment, the encoded ballot 36 includes a barcode encoded with the voter's choices. However, those skilled in the art will realize that generating a ballot 36 may include generating a magnetic card, punching a punch card, or producing any other machine-readable medium. In one embodiment, the encodings on ballot 36 may be printed using magnetic ink character recognition (MICR) technology. MICR is a character recognition system that uses special ink and characters. MICR provides a secure, high-speed method of scanning and processing information. When ballot 36 that contains encodings printed in MICR ink is to be read, ballot 36 is passed through a machine having MICR reading capabilities. The machine magnetizes the ink and then translates the magnetic information into characters. In another embodiment, encoded ballot 36 may also contain a human-readable indicator of the voter's selections (that may also later be read by a document reader employing Optical Character Recognition (OCR) technology). The election authority may decide which type of ballot should be printed by computing device 12.

In addition to or instead of generating ballot 36, computing device 12 may store a voting record 38 of the voter's choices in a data storage location 16. Voting record 38 may be used by the election authority as the official result of the election for that computing device 12 or the election authority may choose the encoded ballot 36 to be the official result. Where the voting record 38 is chosen to be the official result of the election, computing device 12 may communicate directly with a tallying computer 42 which will tally the votes as contained in voting records 38 of one or more computing devices 12. Alternatively, the computing device 12 upon which voter selections are entered may tally the votes directly and report results for that computing device 12. In either case, encoded ballots 36 may be used to verify the result of tallying system 40 in the case of a recount or audit. As such there should be a correlation between the voting records 38 in the memory of computing device 12 and the machine-readable encodings on an associated ballot 36. This correlation may be examined by election or judicial authorities should there be a recount or challenge after the election. By combining electronically tallying voting records 38 and generating encoded ballots 36, a technical advantage may be provided since advanced voting system 10 may offer election authority multiple checks on election results.

Voting record 38 may also contain a unique identifier linking voting record 38 to a particular computing device 12. Voting record 38 is described in greater detail below with respect to FIG. 4. The unique identifier may also be added to the encoded ballot 36. The identifier may be used as a fraud detection device since it would be difficult for counterfeit ballots to contain a code identifying a computing device 12. Additionally, the memory of computing device 12 and the encoded ballot 36 may also be encoded with the digital signature 22 of an election judge. Digital signature 22 may be used as a method of authenticating encoded ballot 36. Using public key technology, ballots 36 so marked have a much smaller chance of being substituted with fraudulent ballots.

Encoded ballot 36 may also include one or more ballot data fields. The ballot data field may be represented by a barcode, magnetic stripe, series of characters printed using magnetic ink character recognition (MICR) technology, or other machine-readable medium. Alternatively or additionally, the ballot data field may include a series of human-readable numbers and/or letters. To prevent fraud, the ballot data field may be unique to a particular encoded ballot 36.

In particular embodiments, the ballot data field may provide information about the election, the voter, and/or the voter's selections. For example, when read by the appropriate machine, the machine-readable ballot data field may translate to:

2002110701992345051020304050xx

Although the digits of the ballot data field may appear random, the ballot data field may include one or more fields providing information valuable to the election authority. In the above example, the first field includes the first eight digits and indicates the date on which the election was held. Thus, the first field of the example ballot data field indicates that the election was held on Nov. 7, 2002. The following field may include the next two digits and may be used to indicate the precinct number in which the vote was cast. For example, the precinct number included in the example ballot is "01". A third field may include two digits recording an identifier associated with the precise computer that the voter used to cast his vote. For example, the ballot data field described above indicates that the voter used computer "99" to cast his vote.

A ballot data field may also include a field recording a double count protection code (DCPC) (such as "2345" in the example ballot data field above). A DCPC may be randomly assigned to each voter voting at the precinct. Each DCPC generated is stored in the voting computer. The voting computer is programmed to consult a table of assigned DCPCs to ensure that no DCPC is assigned more than once. The DCPC of a ballot is read by an appropriate computer when tallying votes, and that computer (and potentially other associated computers) keep a record of which ballots have been tallied according to the DCPC of the ballot. Therefore, if an attempt is made to accidentally or fraudulently recount the ballot, such a recount will be rejected since the DCPC of the ballot is already recorded as having been read. Because the DCPC is randomly assigned, inspection of the DCPC cannot lead to an association of the ballot with a specific voter, and ballot secrecy is maintained.

A ballot data field may also include a series of digits or other indicators that identify the voter's selections. For example, the voter generating the example ballot data field made five choices and voted for candidates "10", "20", "30", "40", and "50". Although digits are used in the example ballot data field, any other appropriate technique may be used for identifying the voter's selections.

Although the ballot data field of an encoded ballot may seem as if it is randomly generated, one studying a series of encoded ballots 36 and ballot data fields may "decode" the arrangement of numbers and/or letters. Accordingly, unscrupulous persons might generate fraudulent encoded ballots 36 in an attempt to effect or compromise the outcome of the election. To prevent fraud, the example ballot data field may also include a field for two or more anti-fraud digits. In the example ballot data field described above, the anti-fraud digits are indicated as "xx." Anti-fraud digits provide a check of all other digits in a ballot data field. The anti-fraud digits may be generated in any appropriate manner, and may be encrypted in a way that is unique for each election (or as often as desired by the election authority). One method of generating the anti-fraud digits sums the digital value of each character in a ballot data field and reduces that sum modulo 99 to arrive at the 2 anti-fraud digits. In one embodiment, before summing, the digital values are looked up on an encryption key that has every possible alphabetic and numeric character code. For example, the string “ABCDEFGHIJKLMNOPQRSTUVWXYZ1234567890” may be an encryption key. Finding the position of the character to be encoded on the key gives the encrypted value. One skilled in the art can use other well-known encryption methods.

A component of voting system 10 may operate to verify the authenticity of the ballot using the ballot data field. For example, ballot reader 37 and/or vote tallying reader 39 may store the anti-fraud digits or the algorithm used to generate the anti-fraud digits and may verify the authenticity of encoded ballot 36 by comparing the anti-fraud digits included in the ballot data field to anti-fraud digits known or generated by ballot reader 37 and/or vote tallying reader 39. Other components of voting system 10 may also be used to verify the authenticity of encoded ballot 36 by verifying the anti-fraud digits appended to the ballot data field.

In some elections, the number of voter choices may be very large. For example, a large number of voter selections is possible in a general election that includes questions regarding the retention of a large number of judges. In such cases, the ballot may contain more than one ballot data field. Alternatively, one or more ballot data fields may include information about the election and/or the voter and one or more other data fields may be used to identify the voter's selections.

Each ballot data field may contain anti-fraud and ECC digits to ensure the integrity of the ballot data field. Furthermore, when more than one ballot data field appears on the ballot, each ballot data field is numbered with the ballot data field number and the total of number of ballot data fields. For example, in one embodiment the ballot data fields appear according to the following form:

12x . . . x and

22y . . . y where “12” means that the ballot data field is number one of two and “x . . . x” is shown to represent the remainder of the first ballot data field, and “22” means that the ballot data field is number two of two and “y . . . y” is shown to represent the remainder of the second ballot data field. Since the ballot field contains the number of the instant ballot data field and also the count of the total number of ballot data fields, the counting system can determine cases in which one or more ballot data fields is absent or is not read.

Although the example ballot data field described above includes digits for storing information about the election, the precinct, the voter, and the voter's selections, the described ballot data field is for example purposes only. The ballot data field may include any information that is useful to the election authority and this information may be included in any order. In alternative embodiments, the ballot data field may not be coded to include information relevant to the election or the voter. Instead, the ballot data field may include any randomly generated arrangement of numbers or letters. Regardless of the techniques used to generate the ballot data field, the fraudulent duplication of encoded ballots may be prevented where the ballot data field is unique to the particular encoded ballot 36. If during the tallying or verifying process, duplicate ballot data fields are encountered, the encoded ballots 36 with such duplicate ballot data fields may be scrutinized or excluded from the election totals. One skilled in the art will notice that duplication of ballots is prohibited despite the fact that voters may make identical selections. The combination of DCPC, computer number and precinct number is assured to be unique across the entire election jurisdiction for each election.

In certain embodiments of system 10, voting booth 24 may also include a ballot reader 37 capable of reading encoded ballot 36 in the form generated by ballot generator 30. Alternatively, the reader 37 may be shared in a separate private location within the polling place. Voters may use the reader 37 to verify that the encodings on ballot 36 actually express the voter's intent. If after receiving a translation of encoded ballot 36 from ballot reader 37, the voter desires to change encoded ballot 36, the voter may ask an election judge for a new election key 20 and the previously generated encoded ballot 36 may be destroyed. This ensures that in the case where encoded ballot 36 is the official vote, there is no opportunity for the voter who changes his mind to vote more than once.

The next step in the voting process is a formal tallying of the all cast votes using tallying system 40. In one embodiment, tallying system 40 may be at the polling place. The voter may present encoded ballot 36 to an election judge who then inserts encoded ballot 36 into a vote tallying reader 39. Vote tallying reader 39 is preferably capable of reading barcodes and other machine-readable formats, and may be connected to a tallying computer 42. Additionally, vote tallying reader 39 may be adapted to accommodate reading a large number of ballots 36. The tallying computing device 42 verifies that digital signature 22 of the election judge is correct and also verifies that the ballot data field on encoded ballot 36 has not been used before. This ensures that votes may not be counted twice as a result of confusion at the polling place. The tallying computing device 42 may also check that the computing device identifier, when added to encoded ballot 36, is valid.

To ensure that there is no misreading of the encoded ballot 36, encodings on ballot 36 may include error correcting codes (ECCs). ECCs are derived from the other digits in the encodings and may be used to independently verify that a reading of the encodings is correct. Because an ECC may be derived from the encodings, the ECC may be said to include “redundant information.” A system employing ECCs can identify redundant information contained within a character string to determine the presence of errors within the remaining characters of the character string. Example systems employing error correcting codes to detect and correct errors may be found in U.S. Pat. No. 4,334,309, issued to Bannon et al. on Jun. 8, 1982, and U.S. Pat. No. 6,282,686, issued to Cypher on Aug. 28, 2001. As implemented in voting system 10, any computing device 12 within system 10 may include ECC software enabling the computing device to generate, identify, and translate ECCs within the encodings on ballot 36.

In particular embodiments, the ballot data field or other encoding on ballot 36 may include one or more ECCs within the stream of characters or bits comprising the ballot data field or other encoding. For example, the field described above as storing anti-fraud digits may alternatively or additionally store ECCs. In certain embodiments, the anti-fraud digits may serve both purposes. For example purposes only and not by way of limitation, assume that the encodings on ballot 36 include the following binary string: 10110011 10. In this example, the first eight bits of the binary string comprise the ballot data field, and the last two bits of the binary string comprise the ECC. In this example, each digit or bit of the ECC is a function of a four-bit portion of the binary string. The first ECC bit is a function of the first four-bits of the ballot data field, and the second ECC bit is a function of the last four-bits of the ballot data field. The example binary string uses a simple function to create the ECC bits. It is recognized, however, that the function may include any mathematical algorithm applicable to the binary string. The example function merely adds the relevant four bits and determines whether the sum is even or odd. In the example, the ECC digit or bit representing an odd sum is a numeral “1”, and the ECC digit or bit representing an even sum is a numeral “0.” Accordingly, because the sum of the first four bits is an odd five, the first ECC bit is a “1.” Because the sum of the second four bits is an even two, the second ECC bit is a “0.” The process of calculating sums over different groups of bits is repeated in order to arrive at a total ECC. Recreating these sums when the characters are read provides the ability to correct single bit errors as described in the references.

Various components of voting system 10 may be software enabled to generate and/or identify ECC digits or bits. In particular embodiments, computing device 12 and ballot generator 30 may generate ECC digits or bits and encode the ECC digits or bits on encoded ballot 36 at voting booth 24. ECC digits or bits may be generated and appended to the ballot data field. Alternatively, ECC digits or bits may be encoded independently on encoded ballot 36. ECC digits or bits may be identified by the placement of the ECC digits or bits in the binary string comprising the ballot data field or by the location of the ECC digits or bits on encoded ballot 36. In particular embodiments, ballot reader 37, vote tallying reader 39, tallying computing device 42, and/or any other computing device within voting system 10 may be enabled with ECC technology. When reading a ballot 36, an ECC-enabled component of voting system 10 may ensure that there are no errors by re-performing the function used to create the ECC digits or bits and comparing the result to the ECCs stored in the binary string. In this manner, components of voting system 10, such as ballot reader 37, vote tallying reader 39, and tallying computing device 42, may verify that the bits within a binary string have been correctly read. ECC technology enables voting system 10 to detect single and double bit errors in the binary string or other encodings on encoded ballot 36, i.e. an error in one or two bits of the ballot data field. The detection of single and double bit errors enables tallying computing device 42 to determine if an encoded ballot 36 should be re-read, discredited, or flagged for visual inspection by the election authority. In particular embodiments, ECC technology may also allow for the automatic correction of single bit errors, i.e. a bit in the ECC does not match an associated portion of the binary string comprising the ballot data field. By automatically correcting single bit errors, tallying computing device 42 may count encoded ballots 36 that might otherwise be discarded or disqualified from consideration.

When polling place tallying is used, tallying computer 42 maintains an ongoing and updated count for votes cast at that particular precinct. If tallying computer 42 loses its memory or must be reset for some reason, encoded ballots 36 can be reread by vote tallying reader 39 to recreate the precinct totals. After the last vote is cast, tallying computer 42 may be used to create a special printed report of precinct totals and may also contain digital signature 22 of an election judge. In one embodiment the report may be called in to a central counting facility, sent by fax or other electronic means, or manually carried to the central counting facility. The special report may also be machine-readable. Thus, the central counting facility need only read, or otherwise tally the special reports of multiple precincts in order to obtain an authority wide result. In another embodiment centralized tallying may be used. In this embodiment tallying computer 42 and vote tallying reader 39 are located at a centralized location rather than at each precinct. As a further alternative, the tallying system 40 may not be necessary at all except for auditing votes in case of a recount or election challenge. In such an embodiment, the vote may be tallied electronically using the voting record 38, as described above.

The various components of system 10 may be associated with one or more computers 12 in one or more locations. For example, some or all of voter identifier system 14, voting booth 24, and tallying system 40 may be located in the same location and be implemented using one or more computing device 12. Furthermore, voter identifier system 14, voting booth 24, and tallying system 40 may share one or more components, if appropriate. Additionally, although data storage device 16 for storing digital signature 22 is illustrated in FIG. 1 as a separate storage location from data storage location 16 for storing registration record 17, it is recognized that all data could be stored in a single data storage location. Similarly, although shown as separate from computing device 12, it is recognized that data storage locations 16 may be included in computing device 12. For example, the hard drive of computing device 12 may serve as a data storage location 16

As a further modification, system 10 may operate without using an election key generator 18 and election key 20. In one embodiment, a voter may be given a ballot after being verified as a registered voter. The voter may take the ballot to voting booth 24 and insert the ballot into ballot generator 30. After completing the voting process, ballot generator 30 may then encode the ballot with the voter's selections to create encoded ballot 36. In an alternative embodiment, the voter need not be given a ballot before entering voting booth 24. Rather, ballot generator 30 may independently create encoded ballot 36. Regardless of whether system 10 includes an election key 20 and regardless of the process used to create encoded ballot 36, encoded ballots 36 may be read, verified, tallied, or otherwise handled by election authority as described above.

A paper ballot voting system, as described above, requires printing specialized ballots prior to each election. In addition to being expensive, a preprinted paper ballot system requires a sufficient amount of lead time for preparing and printing the ballots. Because system 10 requires no preprinted ballots, system 10 may be leased to an election authority to mitigate election costs. In one embodiment, system 10 could be leased to an election authority for the same cost of preparing preprinted ballots for a printed ballot system.

Figure 2:
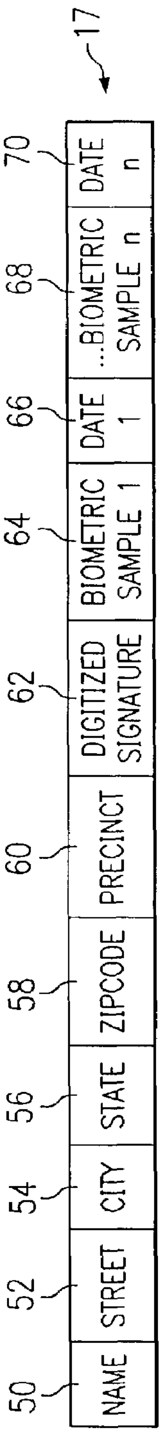
FIG. 2 illustrates an example registration record for use with an advanced voting system.

FIG. 2 illustrates an example registration record 17 for use with advanced voting system 10. Voter registration is also an important part of any voting system 10. In previous systems, a voter registers to vote at an established registration facility or is registered by registrars at ad hoc registration facilities. When the voter registers, the voter typically signs his name. On an election day, when a voter presents himself at a polling place, he identifies himself and his identity may be checked by comparing a signature made at the polling place with the signature made at the time of registration. Previous systems depend on the skill of an election judge to verify that the signature made at the polling place matches the signature made when the voter registered. Election judge's are often not adequately trained in handwriting analysis and an imposter may be able to vote in lieu of the legally registered voter.

According to one embodiment of system 10, a voter registers to vote as described above and provides identification information such as a driver's license indicating the voter's name and address. Pertinent information pertaining to the voter is stored in a registration record 17, as described above with regard to FIG. 1. Registration record 17 may include a number of fields or segments that each include information or other data relating to the voting process. This information or other data may be in alphanumeric, graphical or any other appropriate format. Contained in the fields within registration record 17 may be the voter's name 50, the voter's street address 52, the voter's city of residence 54, and the voter's state of residence 56 and postal code 58. The address fields 52-58 are often important to the registration process because the address fields may be used to determine the voter's precinct 60, which may also be stored in voting record 38. The address fields 52-58 and/or precinct 60 may also be used to determine the specific ballot questions to be issued to a voter in an election where local issues vary from place to place. The voter may also be required to sign a voter registration card. The signature provided may be used to verify that the person presented is the bona fide registered voter. In one embodiment, an election authority may choose to store an image of voters signature in signature field 62 of registration record 17.

In another embodiment, the voter may be required to provide a biometric sample in addition to or in lieu of the signature 62. A biometric sample may be associated with a high degree of certainty to certain personal, biological characteristics of a person and may be stored for later authentication purposes. The digital representation of a biometric sample may be stored in the biometric field 64. According to the biometric method selected by the election authority, more than one biometric sample may be stored and additional fields 68 for additional biometric samples may be reserved in registration record 17. The analysis of the biometric sample 64 and the linkage of that biometric sample 64 to a voter is called a biometric identification. That biometric identification may be a based on a thumbprint such as disclosed in U.S. Pat. No. 5,729,334, a retinal scan as disclosed in U.S. Pat. No. 5,956,122, a voice print such as disclosed in U.S. Pat. No. 5,901,203 or 6,205,204, or any other biometric identification or combinations thereof. In order to account for changes in physical characteristics of registrants over time, the dates that each biometric sample was created may be stored in date fields 66 and 70 of registration record 17. As shown in FIG. 1, the biometric identification is stored in data storage location 16. In other embodiments, the election authority may opt to store the biometric identification in a centralized storage database or print the biometric identification on a portable medium such as a magnetic stripe card, bar coded card or other suitable medium.

Registration record 17 is used to authenticate the voter's identity at election time. In one embodiment, when the voter arrives at the polling place, the voter is asked to present a signature and that signature is compared against digitized signature 62. Election judge may also or alternatively ask the voter to present a polling place biometric sample of the same type that was provided when the voter registered and as is currently stored in field 64 or 68 of registration record 17. Polling place biometric sample can be used, in conjunction with appropriate computing facilities, to match the polling place biometric sample with biometric sample 66 stored in the registration record 17. The election authority may opt to store the biometric identification in a centralized storage database or print the biometric identification on a portable medium such as a magnetic strip car, bar coded card, or other suitable medium. One advantage of storing registration record 17 in a portable medium that is retained by the voter is avoiding centralized storage of biometric identification data, which may be seen by some as a threat to privacy. Nonetheless, the election authority may prefer a centralized storage to ensure that voters are not denied the right to vote simply because the voter lost his voter registration card or other medium storing the biometric sample. In such an embodiment, the polling place biometric sample provided by the user may be compared via communication techniques with the biometric sample 66 stored centrally or the centrally stored information may be copied or communicated to computing facilities at the polling place.

Figure 3A:
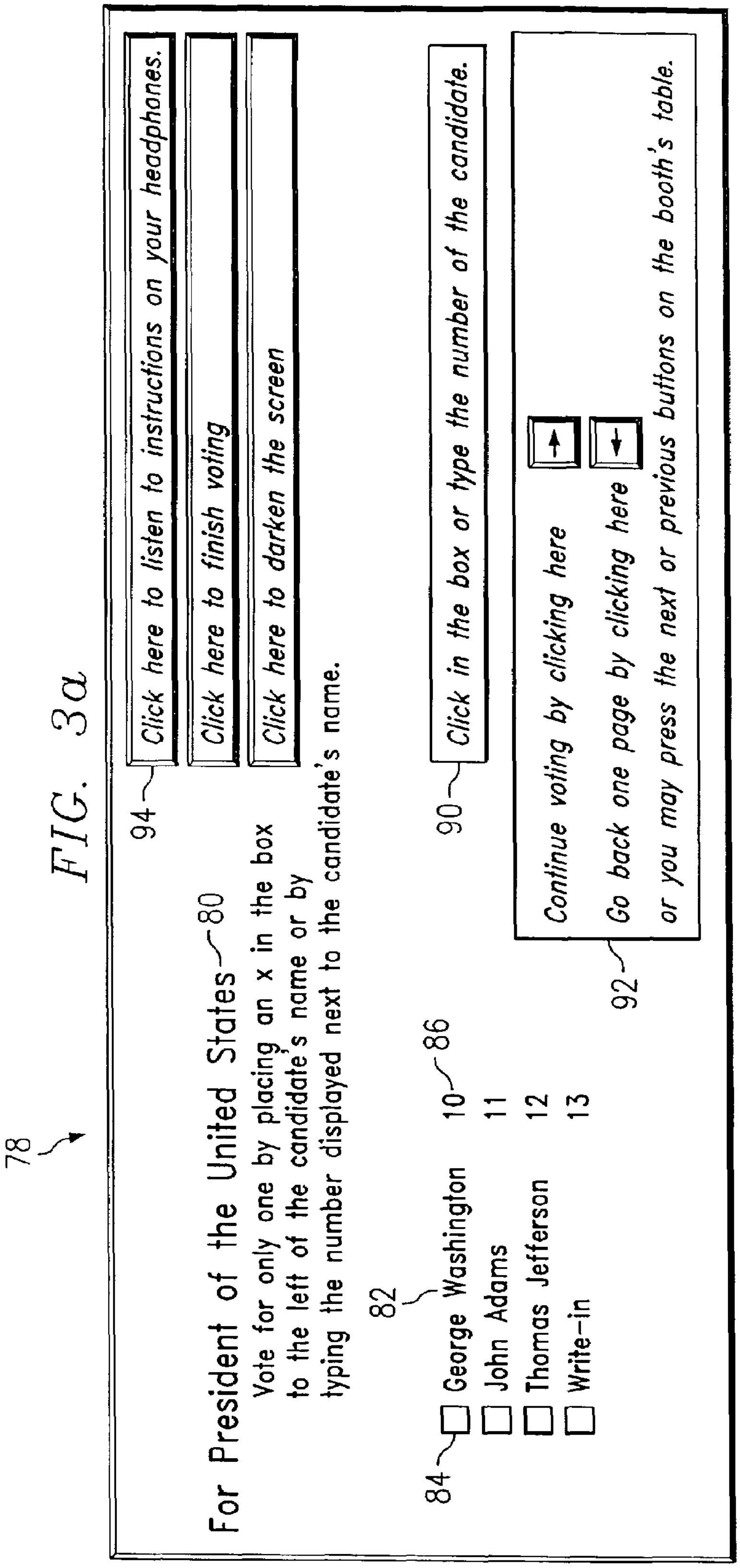
FIGS. 3A and 3B illustrate example computer ballots and computer screen instructions for indicating a selection using an advanced voting system.
Figure 3B:
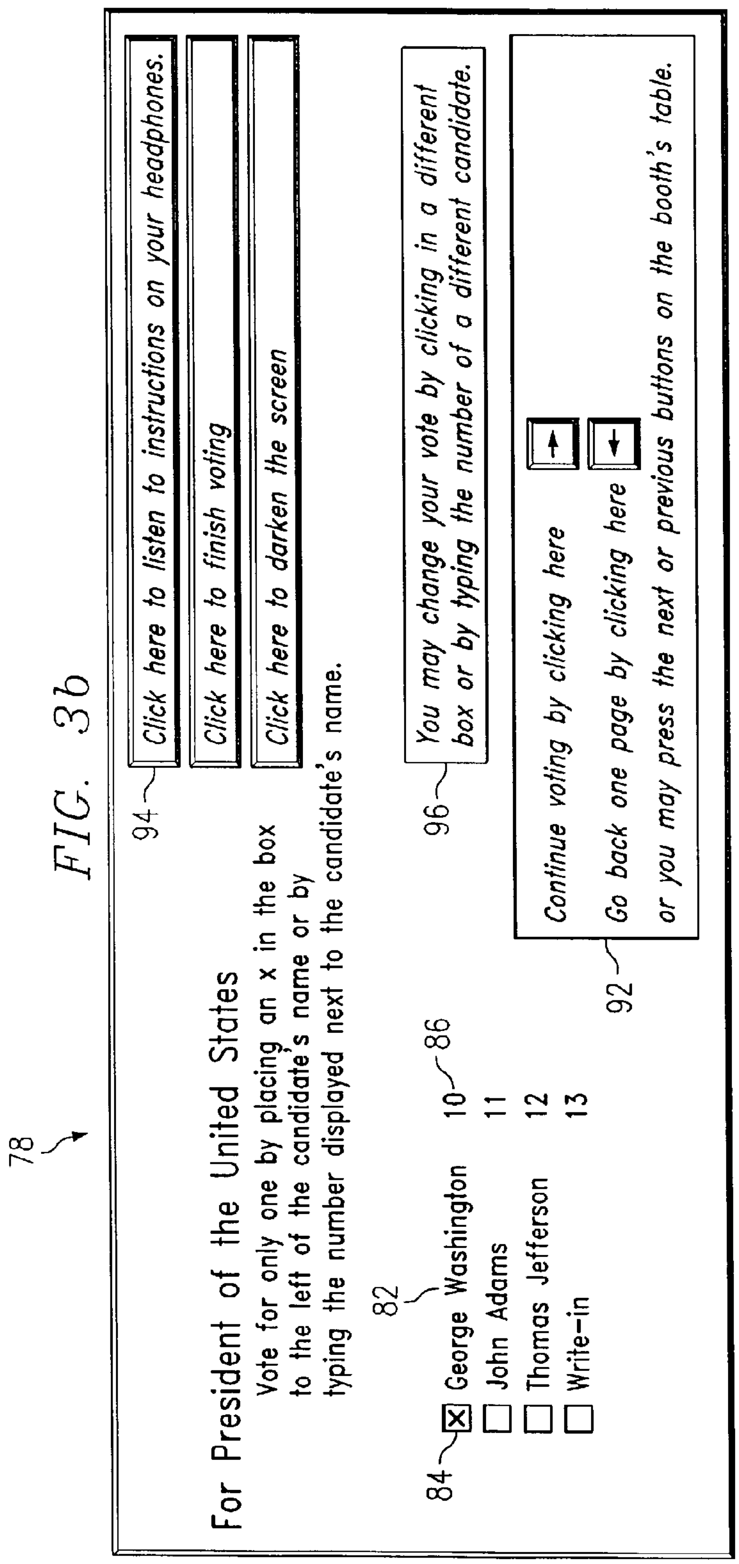

FIGS. 3A and 3B illustrate particular embodiments of example computer ballots 78 and computer screen instructions that may be used in conjunction with system 10. If the ballot question is for an office, as illustrated in FIGS. 3A and 3B, the voter is shown a screen that states the name of the office 80 and displays the names 82 and party affiliations of all candidates. Certain races, such as that for the President of the United States, may have coupled candidates such as president and vice president. The candidate names 82 and other information identifying the candidates are each displayed along with a check box 84. Near to, and associated with the name of the candidate, may also be a candidate number 86.

FIG. 3A illustrates a computer ballot 78 prior to the voter's selection of a candidate. In one embodiment, the voter expresses a choice by using mouse 26 or other appropriate input device to click on or otherwise make a selection of the candidate name 82, the box 84 next to candidate name 82, or the candidate number 86. Those skilled in the art will understand that a touch sensitive screen 34 may also or alternatively be used and the voter may touch the candidate's name 82, box 84 or number 86 to express a choice. Particular embodiments of the present invention also provide alternative methods for the voter to express a choice. As an example only, the voter may type the name 82 or number 86 of the candidate and, in so doing, the choice may be indicated in the box 84 next to the candidate name 82, as illustrated in FIG. 3B. Election authorities may choose to have one, a combination of more than one, or all of these selection methods available to voter. Alternatively or additionally, the voter may also be able to indicate the desire to vote for all candidates with a particular party affiliation in a number of different races. Where desirable, voting system 10 may also support cumulative voting in one or more races.

A computerized voting system 10 may be new to many voters who are not experienced in using computers. Therefore, in one embodiment, the voting authority may decide to present only one question at a time on screen 34. Also, context sensitive instructions may appear on screen 34 after each voter action. According to one embodiment, when a ballot question 78 first appears, instructions 90 may be displayed on the screen regarding how to select a candidate and instructions 92 may be displayed regarding how to proceed to the next or previous questions. Instructions to the voter may be placed in a part of the screen that is not related to voting. To further minimize voter confusion, instructions to the voter may be displayed in a different typeface, color and/or font size. Additionally, an election authority may decide to include instructions 94 informing the voter that spoken instructions are available on a headset 28 if the voter clicks on instructions 94. As is illustrated in FIG. 3B, after the voter indicates a selection, the context sensitive, on-screen instructions 96 may be displayed to inform the user how to change his selection. The voter may then proceed with the next question or may return to a previous question.

Particular embodiments also provide the ability to guide the voter through casting a write-in ballot. Some election jurisdictions do not count write-in votes unless a candidate has properly registered as a write-in candidate. In that case, the voting system 10 may show a box on the screen indicating that write-in votes may be made when a voter has a write-in choice. The voter may be allowed to select "write-in" as a candidate choice using any of the above described methods. Once selected, an instruction may appear explaining that the voter will be able to write the name of the write-in candidate on encoded ballot 36 once produced by ballot generator 30. A space may be created on encoded ballot 36 allowing the voter to add such a name. The fact that there is a write-in candidate on the computer ballot is encoded in ballot 36 to allow for manual processing of the write-in. Alternatively, the voter may be instructed that he should type the name of the write-in candidate on keyboard 26 or otherwise enter the candidate's name. The voter may also or alternatively write-in the name manually.

As mentioned above, particular embodiments of the present invention allow the visually impaired or those who are not proficient in reading to vote. If the voter selects to listen to instructions on headphones 28 as described above, the voter is guided through the voting process by prerecorded spoken instruction. The name of the office and the candidates names are spoken to let the voter know who all the candidates are. The list may be repeated to minimize confusion. The voter may then be told to press a mouse button 26, press anywhere on the touch sensitive screen 34, or take any other appropriate action to indicate the selection of a candidate whose name is spoken at that time. To ensure the user's selection was properly registered, the system may then repeat to voter the selection that was made. Similarly, computing device 12 may speak instructions to voter on how to proceed (for example, "click now to go back" or "click now to go forward"). The voter's intent is registered by the time proximity between the spoken prompt and voter's pressing of the button or other appropriate action.

In one embodiment, the election authority may decide at the time the user leaves each ballot question to perform an undervote/overvote test, as described with regard to FIG. 1. Again, depending on a particular embodiment and election laws, overvotes and undervotes may or may not be allowed. According to the options provided by particular embodiments, the user may be warned that an undervote or an overvote has occurred at the time the voter leaves a ballot question. Alternatively or additionally, such warnings may be presented to the voter at the end of the voting session, according to the rules of the election authority.

Figure 4:
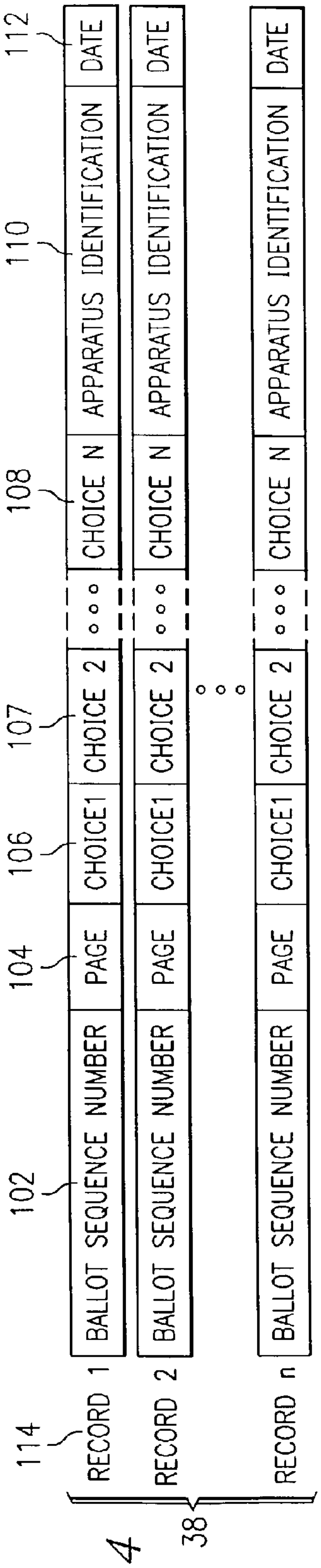
FIG. 4 illustrates a voting record that may be generated by an advanced voting system.

FIG. 4 illustrates a voting record 38 that may be generated by system 10. As described with regard to FIG. 1, system 10 maintains a voting record 38 of each vote on each question as selected by the voter. Voting record 38 may contain the ballot data field 102 described above, the ballot page 104 for which the voter made a selection, and each choice 106 made by voter. For an election, such as for president, where only one vote may be cast, only one choice 106 will have been recorded in voter register 38. By contrast, elections for offices electing more than one candidates to a position, such as town council, several choices 106 will be recorded in voting record 38. An example embodiment of the present invention allows up to 32 choices per ballot page 104. Furthermore, an apparatus identifier 110 may identify a particular computing device 12 used by the voter to prevent fraud. The date 112 of the election may also be stored in voting record 38 as a further check. In an effort to protect the identity of the voter, election authority may choose to record only the date, and not the time, of the registration of a choice 106. A different record 38 may be stored for each different ballot question. For a given voter, the ballot data field 102 is the same in each such record 38. This allows each voter to review on his or her choices and protects choices made by other voters from being accessed.

FIG. 5 illustrates an example of a method for using advanced voting system 10. The method begins at step 150 by storing identifying information for a particular voter in registration record 17. As described in regard to FIG. 2, registration record 17 may contain the voter's name, address, precinct, and a digitized signature. Additionally or alternatively, voter may be required to submit one or more biometric samples, which may also be stored in registration record 17. When voter arrives at the polling place; a voter's identity may be authenticated at step 152 by comparing a presented signature or other identifying information with the digitized signature 62 or other identifying information stored in registration record 17. In embodiments utilizing biometric samples, a biometric sample 64 stored on registration record 17 may be compared to a biometric sample submitted at the polling place (instead of or in addition to the signatures being compared).

After voter's identity is authenticated, an election key 20 is generated at step 154 and given to the voter. An encoded digital signature 22 of the election judge for voter's precinct may be stored on election key 20. The voter inserts election key 20 into computing device 12 associated with a voting booth 24 (or a peripheral in communication with computing device 12) at step 156. Computing device 12 may communicate with election key 20 at step 158 to retrieve voter information. For example, voter information may include an electronic ballot to be used by the voter that was stored on election key 20 or information identifying an electronic ballot stored at computing device 12 to be used by the voter.

At step 160 after an appropriate ballot or other voter information is retrieved, computing device 12 presents an instruction screen to the voter to allow the voter to decide whether to see detailed instructions before voting. In one embodiment, step 160 may also include the voter choosing to listen to auditory instructions and donning headphones 28 connected to computing device 12. Alternatively, voter may choose at step 160 to forgo the instruction screens altogether. At step 162, the first ballot question 78 is presented to the voter. Example ballot questions 78 were described in greater detail above in regard to FIG. 3. Voter then enters voter selections to the ballot question at step 164. In one embodiment, step 164 includes the voter indicating a selection by typing on keyboard 32. In other embodiments, step 164 may include voter indicating a selection by clicking on mouse 26 or touching touch-sensitive monitor 34. As part of step 164 and after voter has indicated his voter selection, a screen may appear that informs the voter of how he may proceed to the next ballot question or return to the previous ballot question. Computing device 12 may audit voter's selection as a step 166 to determine whether there has been an undervote or overvote before proceeding to the next ballot question. Where such an irregularity is detected, computing device 12 may inform voter of the situation and may prompt voter to remedy the situation if local election laws allow. Alternatively this step may not be performed at all or may be performed after the voter has completed the ballot.

At step 168, computing device 12 determines whether there are additional ballot questions to be presented to the voter. If additional questions exist to present to the voter, the method returns to step 162 and computing device 12 presents the next question to the voter. Computing device 12 will continue the process by proceeding through steps 162-168 until the last ballot question 78 is presented to the voter. After all ballot questions are presented to the voter, the method proceeds to step 170 where computing device 12 presents the voter with a summary of voter selections. In one embodiment, step 170 includes giving the voter the choice of either finalizing voting selections as they appear in the summary or returning to previous screens to change his voting selections before finalizing his voter selections. Where voter chooses to return to previous screens, the method will return to step 162 and proceed forward from there. At step 172 the voter's selections are stored in an anonymous voting record 38. Multiple voting records 38 may be used for audit purpose when irregularities are discovered or when a vote is challenged.

As described above, computing device 12 may be coupled to ballot generator 30. Step 174 includes production of a machine-readable encoded ballot 36 by ballot generator 30. Encoded ballot 36 may be encoded with the voter's selections. At step 176, voter selections are tallied. In one embodiment, the multiple encoded ballots may be tallied by a tallying computing device 42. Step 176 may include feeding the encoded ballots 36 to a ballot reader 37 that tallies the votes at each precinct. Alternatively or additionally, step 176 may include tallying encoded ballots 36 at a centralized location. In such embodiment, encoded ballots 36 may be carried to the centralized location or may be electronically transmitted to the centralized polling place. As a further alternative, step 176 may include tallying the multiple anonymous voting records 38 generated by computing device 12 to produce precinct totals.

At step 178, a determination is made as to whether any irregularities have occurred in either the tallying process or the selections cast. This determination may be made by a computing device, the tallying computer, a ballot reader, or a person associated with the election authority. If such a problem has occurred, the method may continue by recounting encoded ballots at step 180. Additionally or alternatively, voting records 38 as stored in computing device 12 may be recounted to provide an additional check on ballot totals. Recounts may also be made using a substantially similar procedure as described in above with regard to step 178 in response to requests by candidates or others challenging election results.

Computing device 12 may proceed through the voting process in the order as shown in steps 150-180 in FIG. 5 and as described above. However, it is recognized that one skilled in the art may perform the steps of the method in any suitable order.

FIG. 6 illustrates an example system for absentee voting. Absentee ballots 118 can play an important role in an election. It is difficult to ask voters to prepare a machine-readable ballot expressing the voter's intent. Such ballots are generally prepared by a machine and such machines are not likely to be available to an absentee ballot voter. Some prior art systems attempted to solve this problem by supplying the absentee voter with pre-printed bar coded stickers containing encoding pertaining to all candidates. In addition to being expensive, adhesive labels may be destroyed prior to reaching the user or adhesive labels may become subsequently stuck in a reading machine.

One embodiment of the present invention allows absentee ballots 118 to be distributed to voters without such adhesive backing. As shown in FIG. 6, associated with each candidate is a bar code 120 that contains an encrypted code that will define the voter's choice. The ballot also contains an identifying area 122 with the name, picture, and/or other information identifying the candidate. Near the start of the bar code is a box 124 and two arrows 126 straddling bar code 124. When indicating a choice, the absentee ballot voter is asked to fill in box 124 between the pair of arrows 126 with a pen or pencil. When box 124 is filled in, the appropriate bar code will be obliterated. For an example to demonstrate this technique, assume that bar code 124 for candidate George Washington contains the code "2." Assume that the bar code 124 for candidate John Adams contains the code "1." When the voter fills in box 124 in order to vote for George Washington, the code "2" will no longer be able to be read by the machine reader. When read, the absence of the code associated with the candidate along with the codes (not obliterated of the other candidates for the same office) unequivocally indicates the voter's choice in a machine-readable fashion.

Although FIG. 6 illustrates absentee ballot 118 as including bar code 120, absentee ballot 118 may include any other machine-readable means for indicating a voter selection. Each machine-readable area may be proximate to and associated with identifying area 122. In one example, the machine-readable area may include a symbol or character that may be marked or otherwise altered by a voter to indicate the voter's selection. Accordingly, machine-readable area may include one or more dashes, underscores, or a box proximate to identifying area 122. A voter may indicate a voter selection by checking or otherwise marking the dashes, underscores, or box.

In another example, absentee ballot 118 may include a series of numbers and/or letters associated with each candidate. In particular embodiments, the numbers and/or letters may be printed using magnetic ink character recognition (MICR) technology. MICR is a character recognition system that uses special ink and characters. MICR provides a secure, high-speed method of scanning and processing information. When absentee ballot 118 that contains encodings printed in MICR ink is to be read, absentee ballot 118 is passed through a machine having MICR reading capabilities. The machine magnetizes the ink and then translates the magnetic information into characters. For reading and decoding absentee ballots 118, any computing system or ballot reader, such as ballot reader 37, vote tallying reader 39, and tallying computer 42 may include software enabling MICR recognition and translation.

In making a voter selection, the voter may be requested to obliterate or alter the machine-readable area. For example, the voter may be requested to scratch through the machine-readable area associated with the candidate for whom the voter is selecting. When scratched through or otherwise altered, the machine-readable area associated with a candidate and the corresponding identifying area 122 will no longer be readable by the machine reader. In this example, the absence of a code associated with the candidate along with the codes not obliterated for the other candidates for the same office unequivocally indicates the voter's choice in a machine-readable fashion.

In other embodiments, the voter may be requested to obliterate or alter the machine-readable areas associated with each candidate that the voter is not selecting. In these embodiments, the scratched through or obliterated machine-readable area will not be readable by the machine reader. The only machine-readable area that will be detected and read by the machine reader will be the machine-readable area that the voter has not marked or altered. In this example, when read, the presence of the code associated with the candidate chosen and the absence of any other machine-readable codes unequivocally indicates the voter's choice in a machine-readable fashion. Regardless of the type of machine-readable indicator used, possible technical advantages of such a system are improved accuracy and rate of speed in counting absentee ballots 118. After absentee ballots 118 are read, tallying system 40 may be used to count such absentee ballots 118.

Although the present invention has been described with several embodiments, numerous changes, substitutions, variations, alterations, transformations, and modifications may be suggested to one skilled in the art, and it is intended that the present invention encompass all such changes, substitutions, variations, alterations, transformations, and modifications as fall within the spirit and scope of the appended claims.

What is claimed is:

1. An advanced voting system, comprising:

one or more computing devices operable to:

display ballot questions to the voter; and receive interactive voter selections from the voter;

a ballot generator operable to generate tangible ballots comprising the voter selections and comprising a double count protection code (DCPC) automatically assigned to the voter that is used to prevent a ballot from being counted more than once, wherein the DCPC does not identify the voter; and a tallying system operable to read the tangible ballots and to tally the voter selections, the tallying system further operable to maintain a record of the DCPC of the ballots that have been tallied to prevent a ballot from being recounted.

2. The system of claim 1, wherein the computing device is operable to store one or more voter selections in a voting record.

3. The system of claim 2, wherein the voting record comprises a unique identifier linking the voting record to a particular computing device.

4. The system of claim 2, wherein the voting record comprises a digital signature particular to the voter's precinct.

5. The system of claim 1, wherein the computing device is further operable to receive voter selections by human touch on a monitor.

6. The system of claim 1, wherein the computing device is further operable to display interactive help screens in a voter-selectable language.

7. The system of claim 1, wherein the computing device is further operable to generate recorded auditory instructions in a voter-selectable language.

8. The system of claim 1, wherein the computing device is further operable to compare the identifying information stored in a registration record to identifying information provided by the voter at the time of voting.

9. The system of claim 1, wherein the tangible ballot comprises a digital signature particular to the voter's precinct.

10. The system of claim 1, wherein the one or more computing devices are operable to audit whether an appropriate number of selections has been made by the voter as governed by election laws and the particular ballot questions.

11. The system of claim 1, wherein the one or more computing devices are personal digital assistants.

12. The system of claim 1, wherein the advanced voting system further comprises a tallying system, the tallying system operable to:

receive voter selections of a plurality of voters from one or more of the computing devices;

electronically tally the voter selections to reach one or more ballot question totals; and audit the one or more ballot question totals using the tangible ballots comprising the voter selections.

13. The system of claim 12, wherein:

the tallying system further comprises a ballot reader operable to tally voter selections included in a plurality of tangible ballots; and auditing the ballot question totals comprises comparing tally of votes from tangible ballots with electronic tally of votes.

14. The system of claim 1, wherein the advanced voting system further comprises a tallying system, the tallying system comprising:

a voting record stored on one or more of the computing devices, the voting record comprising one or more voter selections from a plurality of voters; and a tallying computer operable to communicate with the voting record and electronically tally voter selections to reach one or more ballot question totals.

15. The system of claim 1, wherein the advanced voting system further comprises a tallying system, the tallying system operable to:

receive voter selections of a plurality of voters from one or more of the computing devices;

store a voting record on one or more of the computing devices, the voting record comprising one or more voter selections from a plurality of voters;

electronically tally the voter selections using a tallying computer to reach one or more ballot question totals; and audit the one or more ballot question totals using the tangible ballots comprising the voter selections.

16. The system of claim 1, wherein the advanced voting system further comprises at least one ballot reader, each ballot reader operable to tally voter selections of a plurality of voters included on tangible ballots.

17. The system of claim 1, wherein the advanced voting system further comprises at least one ballot reader, each ballot reader operable to verify voter selections included on the tangible ballot.

18. The system of claim 1, wherein:

the one or more computing devices are further operable to present an option to a voter allowing the voter to choose to write-in one or more voter selections; and the ballot generator is further operable to create a write-in selection space on the tangible ballot to allow the voter to write-in one or more voter selections after the tangible ballot is generated.

19. The system of claim 1, wherein the computing device comprises a screen, wherein a substantial portion of the screen is sensitive to human touch to receive voter selections.

20. The system of claim 19, wherein the computing device is further operable to:

broadcast recorded auditory instructions in a voter-selectable language to the voter after receiving the interactive voter selections from the voter, the auditory instructions giving a voter choice between reviewing one or more previously made voter selections associated with a previous ballot question or skipping forward to a next ballot question;

receive voter selections from an input device coupled to the computing device, the input device being in addition to the touch-sensitive screen; and process the voter choice as received by the input device.

21. The system of claim 19, wherein the computing device is further operable to:

broadcast recorded auditory instructions in a voter-selectable language to the voter before receiving the interactive voter selections from the voter, the recorded auditory instructions comprising a plurality of recorded prompts instructing the voter on how to enter a voter selection; and determine the intent of the voter by associating the time proximity between when the recorded prompt was broadcasted to the voter and when the screen was touched.

22. The system of claim 1, wherein the advanced voting system further comprises at least one ballot reader operable to:

read the tangible ballots; and display the voter selections included on the ballot to the voter.

23. The system of claim 1, wherein the voter selections are represented on the tangible ballot using a barcode.

24. The system of claim 1, wherein at least a portion of the voter selections on the tangible ballot are machine-readable.

25. The system of claim 1, wherein at least a portion of the voter selections on the tangible ballot are human-readable.

26. The system of claim 25, wherein the portion of the voter selections that are human-readable are also machine-readable.

27. The system of claim 1, wherein the computing device is further operable to:

interface with a telephone system linking the computing device to a voter telephone;

broadcast recorded auditory instructions in a voter-selectable language to the voter over the voter telephone, the recorded auditory instructions comprising a plurality of recorded prompts instructing the voter on how to enter a voter selection; and receive voter selections from the voter over the voter telephone.

28. The system of claim 27, wherein the recorded auditory instructions instruct the voter to press one or more of a plurality of keys on the voter telephone to make a selection.

29. The system of claim 27, wherein the recorded auditory instructions instruct the voter to speak into the voter phone to make a selection.

30. The system of claim 1, wherein the computing device is coupled to audio output device, the computing device further operable to broadcast recorded auditory instructions to the voter over the audio output device.

31. The system of claim 1, wherein the tangible ballot comprises one or more ballot data fields.

32. The system of claim 31, wherein the one or more ballot data fields are randomly generated.

33. The system of claim 31, wherein the one or more ballot data fields each include one or more fields storing voting information.

34. The system of claim 33, wherein the voting information comprises information identifying a date of the election, a precinct in which the voter is authorized to vote, and a computing device identifier.

35. The system of claim 33, wherein at least a portion of the voting information comprises a plurality of digits identifying the voter selections.

36. The system of claim 31, wherein at least one of the ballot data fields comprises the DCPC.

37. The system of claim 31, wherein the ballot data field comprises anti-fraud digits.

38. The system of claim 37, wherein the anti-fraud digits are generated as a function of all other digits comprising the ballot data field.

39. The system of claim 37, wherein the anti-fraud digits are encrypted.

40. The system of claim 39, wherein an encryption technique used to encrypt the anti-fraud digits is changed periodically.

41. The system of claim 1, further comprising a tallying system operable to:

read the tangible ballot;

identify one or more error correcting codes on the tangible ballot; and determine if the reading of the tangible ballot corresponds with the one or more error correcting codes.

42. The system of claim 41, wherein determining that the reading of the tangible ballot corresponds with the one or more error correcting codes comprises comparing the one or more error correcting codes identified on the tangible ballot to a stored error correcting code.

43. The system of claim 41, wherein determining that the reading of the tangible ballot corresponds with the one or more error correcting codes comprises:

performing a function to generate one or more comparison error correcting codes; and comparing the one or more error correcting codes identified on the tangible ballot to the one or more comparison error correcting codes.

44. The system of claim 41, wherein the tallying system is further operable to:

determine that the reading of the tangible ballot does not correspond with the one or more error correcting codes; and reject the tangible ballot.

45. The system of claim 41, wherein the tallying system is further operable to use the error correcting code to automatically correct data of the tangible ballot that does not correspond with the error correcting code.

46. The system of claim 1, further comprising an election key generator operable to generate an election key storing information related to each voter, the one or more computing devices operable to interface with the election key and retrieve information from the election key, the election key comprising a smart card.

47. The system of claim 46, wherein:

the election key generator is further operable to store one or more ballot questions customized for the particular voter on an election key; and the one or more computing devices are further operable to retrieve the ballot questions from the election key for display to the voter.

48. The system of claim 46, wherein the one or more computing devices are further operable to use the information retrieved from the election key to identify ballot questions stored at the computing device that are appropriate for the particular voter.

49. The system of claim 46, wherein:

the information stored in the election key comprises a digital signature; and the one or more computing devices are further operable to display the ballot question to the voter only if an appropriate digital signature is retrieved from the election key.

50. A method for advanced voting, comprising:

displaying ballot questions to the voter at a voting booth;

receiving interactive voter selections from the voter at the voting booth;

generating, using a ballot generator, tangible ballots comprising the voter selections and comprising a double count protection code (DCPC) automatically assigned to the voter that is used to prevent a ballot from being counted more than once, wherein the DCPC does not identify the voter; and reading the tangible ballots and tallying the voter selections using a tallying system, the tallying system also maintaining a record of the DCPC of the ballots that have been tallied to prevent a ballot from being recounted.

51. The method of claim 50, further comprising storing one or more voter selections in a voting record.

52. The method of claim 51, wherein the voting record comprises a unique identifier linking the voting record to a particular voting booth.

53. The method of claim 51, wherein the voting record comprises a digital signature particular to the voter's precinct.

54. The method of claim 50, further comprising receiving the voter selections by human touch on a monitor.

55. The method of claim 50, further comprising displaying interactive help screens in a voter-selectable language.

56. The method of claim 50, further comprising generating recorded auditory instructions in a voter-selectable language.

57. The method of claim 50, further comprising comparing the identifying information stored in a registration record to identifying information provided by the voter at the time of voting.

58. The method of claim 50, further comprising auditing whether an appropriate number of selections has been made by the voter as governed by election laws and the particular ballot questions.

59. The method of claim 58, wherein auditing the one or more ballot question totals comprises verifying the number of electronically tallied voter selections by comparing the number of electronically tallied voter selections with the number of tangible ballots.

60. The method of claim 50, further comprising:

electronically tallying voter selections by a plurality of voters to reach one or more ballot question totals; and auditing the one or more ballot question totals using the tangible ballots comprising the voter selections.

61. The method of claim 60, wherein tallying voter selections further includes detecting irregularities in voter selections.

62. The method of claim 50, further comprising:

storing one or more voter selections from a plurality of voters at the voting booth; and communicating the voting record to a tallying computer, the tallying computer operable to electronically tally voter selections to reach one or more ballot question totals.

63. The method of claim 50, further comprising:

receiving voter selections of a plurality of voters from one or more of the computing devices;

storing a voting record on one or more of the computing devices, the voting record comprising one or more voter selections from a plurality of voters;

electronically tallying the voter selections using a tallying computer to reach one or more ballot question totals; and auditing the one or more ballot question totals using the tangible ballots comprising the voter selections.

64. The method of claim 50, further comprising:

presenting the voter with the option of choosing to write-in the voter selections; and providing a write-in selection space on the tangible ballot to allow the voter to write-in one or more voter selections after the tangible ballot is generated.

65. The method of claim 50, further comprising receiving the voter selections by human touch on a screen of a computing device, wherein a substantial portion of the screen is sensitive to human touch to receive voter selections.

66. The method of claim 65, further comprising:

broadcasting recorded auditory instructions in a voter-selectable language to the voter before receiving the interactive voter selections from the voter, the recorded auditory instructions comprising a plurality of recorded prompts instructing the voter on how to enter a voter selection; and determining the intent of the voter by associating the time proximity between when the recorded prompt was broadcasted to the voter and when the screen was touched.

67. The method of claim 65, further comprising:

broadcasting recorded auditory instructions in a voter-selectable language to the voter after receiving the interactive voter selections from the voter, the auditory instructions giving a voter choice between reviewing one or more previously made voter selections associated with a previous ballot question or skipping forward to a next ballot question;

receiving voter selections from an input device coupled to the computing device, the input device being in addition to the touch-sensitive screen; and processing the voter choice as received by the input device.

68. The method of claim 50, further comprising:

reading the tangible ballot using a tangible ballot reader; and displaying the voter selections included on the ballot to the voter.

69. The method of claim 50, wherein the voter selections are represented on the tangible ballot using a barcode.

70. The method of claim 50, wherein at least a portion of the voter selections on the tangible ballot are machine-readable.

71. The method of claim 50, wherein at least a portion of the voter selections on the tangible ballot are human-readable.

72. The method of claim 71, wherein the portion of the voter selections that are human-readable are also machine-readable.

73. The method of claim 50, further comprising:

interfacing with a telephone system linking the computing device to a voter telephone;

broadcasting recorded auditory instructions in a voter-selectable language to the voter over the voter telephone, the recorded auditory instructions comprising a plurality of recorded prompts instructing the voter on how to enter a voter selection; and receiving voter selections from the voter over the telephone.

74. The method of claim 73, wherein the recorded auditory instructions instruct the voter to press one or more of a plurality of keys on the voter telephone to make a selection.

75. The method of claim 74, wherein the recorded auditory instructions instruct the voter to speak into the voter phone to make a selection.

76. The method of claim 50, further comprising broadcasting recorded auditory instructions to the voter over a set of headphones.

77. The method of claim 50, wherein the DCPC is randomly generated.

78. The method of claim 50, further comprising including a ballot data field on the tangible ballot.

79. The method of claim 78, wherein the ballot data field comprises the DCPC.

80. The method of claim 78, wherein the ballot data field includes one or more fields storing voting information.

81. The method of claim 80, wherein at least a portion of the voting information comprises a plurality of digits identifying the voter selections.

82. The method of claim 78, wherein the ballot data field comprises information identifying a date of the election, a precinct in which the voter is authorized to vote, and a computing device identifier.

83. The method of claim 78, wherein the ballot data field comprises anti-fraud digits.

84. The method of claim 83, wherein the anti-fraud digits are generated as a function of all other digits comprising the ballot data field.

85. The method of claim 50, further comprising:

reading the tangible ballot;

identifying one or more error correcting codes on the tangible ballot; and determining if the reading of the tangible ballot corresponds with the one or more error correcting codes.

86. The method of claim 85, wherein determining that the reading of the tangible ballot is correct comprises:

performing a function to generate one or more comparison error correcting codes; and comparing the one or more error correcting codes identified on the tangible ballot to the one or more comparison error correcting codes.

87. The method of claim 85, further comprising:

determining that the reading of the tangible ballot does not correspond with the one or more error correcting codes; and rejecting the tangible ballot.

88. The method of claim 85, further comprising automatically correcting data of the tangible ballot that does not correspond with the error correcting code.

89. The method of claim 50, further comprising:

generating an election key storing information related to each voter, the election key comprising a smart card; and retrieving information from the election key.

90. The method of claim 89, further comprising:

storing one or more ballot questions customized for the particular voter on the election key; and retrieving the ballot questions from the election key for display to the voter.

91. The method of claim 89, further comprising using the information retrieved from the election key to identify ballot questions appropriate for the particular voter.

92. The method of claim 89, further comprising:

storing a digital signature on the election key; and displaying the ballot question to the voter only if an appropriate digital signature is retrieved from the election key.

93. An advanced voting system, comprising:

means for displaying ballot questions to the voter;

means for receiving interactive voter selections from the voter;

means for generating tangible ballots comprising the voter selections and comprising a double count protection code (DCPC) automatically assigned to the voter that is used to prevent a ballot from being counted more than once, wherein the DCPC does not identify the voter;

means for reading the tangible ballots and tallying the voter selections; and means for maintaining a record of the DCPC of the ballots that have been tallied to prevent a ballot from being recounted.

94. An advanced voting system, comprising:

one or more computing devices operable to:

display ballot questions to the voter; and receive interactive voter selections from the voter;

a ballot generator operable to generate a tangible ballot comprising the voter selections and comprising at least one error correcting code, the tangible ballot being generated before the voter selections are cast; and a tallying system operable to read the tangible ballots and to tally the voter selections, the tallying system further operable to determine if a ballot contains an error using the error correcting code and to correct the error using the error correcting code.

95. A method for advanced voting, comprising:

displaying ballot questions to the voter at a voting booth;

receiving interactive voter selections from the voter at the voting booth; and generating, using a ballot generator, a tangible ballot comprising the voter selections and comprising at least one error correcting code, the tangible ballot being generated before the voter selections are cast; and reading the tangible ballots and tallying the voter selections using a tallying system, the tallying system also operable to determine if a ballot contains an error using the error correcting code and to correct the error using the error correcting code.

* * * * *